United States Patent
Grubauer et al.

(10) Patent No.: US 10,189,493 B2
(45) Date of Patent: Jan. 29, 2019

(54) CARRYING ARRANGEMENT FOR CARRYING A MEDICAL APPARATUS

(71) Applicant: Carl Zeiss Meditec AG, Jena (DE)

(72) Inventors: Guenther Grubauer, Neresheim (DE);
Dominik Litsch, Schorndorf (DE);
Josef Schlosser, Aalen-Ebnat (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 15/441,076

(22) Filed: Feb. 23, 2017

(65) Prior Publication Data

US 2017/0240195 A1    Aug. 24, 2017

(30) Foreign Application Priority Data

Feb. 23, 2016    (DE) .................. 10 2016 103 183

(51) Int. Cl.
| | |
|---|---|
| B60B 33/00 | (2006.01) |
| B62B 3/12 | (2006.01) |
| B62B 5/00 | (2006.01) |
| B62B 5/02 | (2006.01) |
| B62B 5/04 | (2006.01) |

(52) U.S. Cl.
CPC .................. B62B 3/12 (2013.01); B62B 5/00 (2013.01); B62B 5/0006 (2013.01); B62B 5/025 (2013.01); B62B 5/049 (2013.01); *B62B 2301/00* (2013.01); *B62B 2301/04* (2013.01)

(58) Field of Classification Search
CPC .. B60L 333/00; B60B 33/00; B60B 2900/531
See application file for complete search history.

(56) References Cited

U.S. PATENT DOCUMENTS

| | | | |
|---|---|---|---|
| 3,048,420 A * | 8/1962 | Umanoff ................... | B62B 3/12 16/18 CG |
| 6,422,580 B1 * | 7/2002 | Hunter .................. | B62B 5/0006 280/33.992 |
| 7,225,903 B2 * | 6/2007 | Nebolon ................... | B62B 3/14 188/19 |
| 2010/0308533 A1 | 12/2010 | Masuda et al. | |

* cited by examiner

*Primary Examiner* — Bryan A Evans
(74) *Attorney, Agent, or Firm* — Walter Ottesen, P.A.

(57) ABSTRACT

Carrying arrangement for carrying apparatuses, in particular medical apparatuses, having a base carrier on which at least three roller elements are arranged in order to move the carrying arrangement with respect to a floor surface. The roller elements are each rotatable about first axes of rotation (D). At least one of these roller elements is pivotable about a pivot axis (S) with respect to the base carrier. The axes of rotation (D) and the pivot axis (S) extend in different directions. At least one supporting element is arranged at least indirectly on the base carrier. The supporting element does not contact the floor in a first position of the carrying arrangement with respect to the floor surface and the supporting element contacts the floor in a second position of the carrying arrangement with respect to the floor, the second position being pivoted with respect to the first position.

24 Claims, 2 Drawing Sheets

CARRYING ARRANGEMENT FOR CARRYING A MEDICAL APPARATUS

CROSS REFERENCE TO RELATED APPLICATION

This application claims priority of German patent application no. 10 2016 103 183.6, filed Feb. 23, 2016, the entire content of which is incorporated herein by reference.

FIELD OF THE INVENTION

The present invention relates to a carrying arrangement for carrying and/or storing apparatuses, in particular medical apparatuses.

BACKGROUND OF THE INVENTION

Medical apparatuses, for example for surgery, are frequently constructed in a mobile manner so that they can be used flexibly in different operating rooms. These storing apparatuses often have rollers in order that the apparatus, or the medical apparatuses located therein, can be shifted or moved. Often, these rollers are provided with a vertical spindle (and are pivotable about the axis of this spindle) in order that the apparatuses can be positioned readily in all directions, particularly in tight spaces. During such movement processes, it is possible for the rollers to rotate inwards depending on the direction of movement with regard to the carrying arrangement, the supporting width of the apparatuses being reduced in this way.

In addition, attempts have been made to keep the footprint of the apparatus (for example, the space taken up by the apparatus) as small as possible, this being effected by appropriate positioning of the rollers or the vertical spindles thereof. However, this always involves a compromise in terms of tipping stability. Particularly in the case of apparatuses with large masses and a high center of gravity (possibly even one that moves around during operation), problems then occur in relation to meeting the standards in relation to the tipping stability and/or dangers for example on account of predictable misuse (in particular deliberately incorrect handling).

Both the increasingly small operating rooms and the increasing number of medical apparatuses set a high demand for a footprint that is as small as possible, that is, a needed area that is as small as possible. Doors of the appliances or apparatuses likewise limit the maximum dimensions. Attempts have sometimes been made in the prior art to restrict different axes of the rollers in terms of the kinematics thereof. Asymmetrical arrangements of the rollers are also known. However, this results in losses in terms of working space.

In addition, it is also known to advise the user of a tipping risk by way of information in the form of signs, for example to give the instruction that the appliance should only be pushed, only pulled by the handles, moved at a reduced speed and the like. However, these measures do not take the predictable misuse into account, that is, the circumstance in which the user takes no notice of this information. This can cause problems in particular in the event of particular urgency.

SUMMARY OF THE INVENTION

It is an object of the invention to provide a carrying arrangement for carrying medical apparatuses, which ensures both a reduction in the area required for positioning (referred to as footprint below) and at the same time high tipping safety.

The object can, for example, be achieved by a carrying arrangement for carrying apparatuses, in particular medical apparatuses, having a base carrier on which at least three roller elements are arranged in order to move the carrying arrangement with respect to a floor surface. These roller elements are each rotatable about first axes of rotation. Furthermore, these roller elements are each pivotable about a (geometric) pivot axis with respect to the base carrier, wherein the axes of rotation and the pivot axis extend in different directions.

According to an aspect of the invention, at least one supporting element (which serves in particular to support the carrying arrangement and/or the base carrier) is arranged at least indirectly on the base carrier, wherein this supporting element does not contact the floor surface in a first position of the carrying arrangement with respect to said floor surface and the supporting element contacts the floor surface (in particular in order to support the carrying arrangement) in a second position (of the apparatus) which is pivoted with respect to the first position. A pivoted position of the carrying arrangement with respect to the first position is understood in particular as being a (possibly slightly) tilted position, that is, a position in which the carrying arrangement is tilted with respect to an upright position (which is in particular a desired position).

An aspect of the invention proposes that the supporting elements contact the floor starting from a particular tipped position and thus actively prevent further tipping. Thus, said supporting element prevents tilting, in particular tilting beyond a particular tipping angle. In other words, although further tipping of the carrying arrangement could occur in the absence of the supporting elements, this is precisely what is prevented by the supporting elements. Preferably, at least one supporting element is configured in a rigid manner. Preferably a plurality of supporting elements and particularly preferably all the supporting elements are configured in a rigid manner.

Advantageously, the carrying arrangement is a storage device for medical apparatuses. In this case, these medical apparatuses can be fixed in position with respect to the carrying arrangement.

Advantageously, at least four such roller elements are arranged on the base carrier. In this case, it is possible for the apparatus to have one such supporting element, but it would also be conceivable for each of said rollers to be assigned a corresponding supporting element, or for two roller elements, for example, to be assigned a supporting element (in particular arranged between said roller elements).

Therefore, the at least one supporting element preferably contacts the floor surface depending on a pivoted position of the carrying arrangement with respect to said floor surface.

Advantageously, the axes of rotation of the roller elements and the pivot axis or pivot axes each extend perpendicularly to one another. Particularly preferably, the pivot axis extends substantially vertically in a desired position of the carrying arrangement. The axes of rotation extend substantially horizontally in a desired position of the carrying arrangement.

Thus, the axes of rotation of the roller elements are preferably also pivotable about the respective pivot axes of the roller elements, but preferably always extend perpendicularly to said pivot axes.

Advantageously, at least one pivot axis is arranged with respect to the base carrier in such a way that, regardless of a pivoted position of the roller element about the pivot axis, the roller element does not project (in particular laterally) or projects only slightly beyond the base carrier and/or the carrying arrangement. Preferably, a maximum lateral or horizontal distance between the pivot axis and an outer circumference of the roller element is less than or equal to an (in particular maximum) lateral or horizontal distance between the pivot axis and the base carrier and/or the carrying arrangement. A slight projection of the roller element beyond the base carrier and/or the carrying arrangement is understood as meaning that said roller element projects beyond the base carrier and/or carrying arrangement preferably with less than 30% of its radius, preferably with less than 20% of its radius and particularly preferably with less than 10% of its radius.

In a further advantageous embodiment, the supporting element extends at least also along the vertical pivot axis. In this case, it is possible for a longitudinal direction of the supporting element to extend precisely in the vertical direction, although it would also be possible for said supporting element to extend in a direction which is inclined with respect to the vertical direction, for example extends at an angle of at most 20°, preferably at most 10° with respect to the vertical direction.

Advantageously, the supporting element, or the contact surface thereof, touches the floor starting from a particular tipped position, regardless of how the movable rollers of the base carrier or of the foot are arranged. In this way, the supporting width is retained in that the supporting element, which touches the floor when the appliance is tipped, is arranged in particular on one side of the roller element.

Advantageously, a contact surface with which the supporting element touches the floor in the event of tilting is at least 0.5 mm, preferably at least 1 mm and preferably at least 2 mm away from the floor surface in a desired position of the carrying arrangement. Advantageously, the contact surface of the supporting element is at most 2 cm, preferably at most 1.5 cm, preferably at most 1.0 cm away from the floor surface in a desired position of the carrying arrangement. In this case, as mentioned above, the supporting element preferably touches the floor only in the event of (undesired) tilting of the carrying arrangement.

In this case, the overhang and the distance from the floor in the non-tipped state preferably determine the maximum tipping angle of the carrying arrangement before the supporting element, or tipping prevention means, acts. From this time, a much higher moment is necessary to make the appliance tip over completely. Preferably, said distance between the contact surface or the supporting element and the floor surface can depend on the nature of the floor surface. Thus, even in the case of rough floor surfaces, it is possible to ensure that the contact surface does not touch the floor surface.

The maximum tipping angle to be achieved before the supporting elements touch the floor depends on the width of the foot and on the position of the center of gravity of the carrying arrangement. The standard in medical technology requires that apparatuses still have to stand safely at an inclination of the floor of 5° (in the transporting position, where specified also) 10°.

The distance from the floor and/or the overhang of the supporting element preferably also depend on which steps or obstacles in general need to be negotiated. In medical technology, steps to be negotiated are up to 10 mm high. Preferably, a (vertical) distance between the contact surface of the supporting element and the floor surface is less than a diameter of cables or tubes which are used in the vicinity of the apparatus. Such diameters of cables or tubes are generally between 5 mm and 15 mm. Particularly preferably, this distance is less than a radius of the cables or tubes which are used in the vicinity of the apparatus. In this way, the supporting element can also be used advantageously to deflect such cables or tubes and/or to prevent the rollers touching or even damaging such cables or tubes.

Preferably, a distance between the contact surface and the floor is variable and/or settable. In this way, the maximum tipping angle of the appliance can also be varied, that is, the tipping angle at which the supporting element touches the floor and therefore the carrying arrangement is supported at least also via the supporting element. Thus, it would be possible for example for the supporting element to have a threaded portion via which this distance between the contact surface of the supporting element and the floor can be varied. It would also be conceivable for an angle at which the supporting element extends with respect to the pivot axis to be variable.

However, the supporting element is preferably configured such that, even in a position in which the supporting element touches the floor, a center of gravity of the carrying arrangement is still within the footprint of the carrying arrangement.

In this way, it is possible for the foot not to be enlarged further and thus for the mobility or control of the appliance not to be restricted further. At the same time an increase in the tipping stability when the carrying arrangement is moved is achieved.

Thus, the supporting element is preferably a supporting element which can essentially absorb compressive forces as soon as the carrying arrangement tips. Generally, the supporting element is preferably capable of absorbing the forces that occur, in particular compressive forces, in the event of tipping. It would be possible here for the supporting element to be arranged directly on the base carrier. However, the supporting element could also be arranged on a roller carrier (and thus indirectly on the base carrier, on which the roller carrier is in turn arranged).

In a further advantageous embodiment, the supporting element is configured such that it guides the roller element over an irregularity. This can be achieved in that a contact surface of the supporting element is likewise slightly shiftable with respect to the floor surface and, in the event of tilting, at least slight lifting of the associated roller occurs such that the roller can be guided over an irregularity.

In a further advantageous embodiment, the roller element is arranged on a shaft that is rotatable about the pivot axis. This shaft in this case preferably extends along the pivot axis. Such a procedure is known for example in furniture on rollers. The supporting element could also be arranged (for example screwed or welded) on this shaft, such that, in the event of a pivoting movement of the roller element, it is accordingly oriented along therewith. Preferably, the apparatus has a bearing device in order to support the pivoting movement of the roller element with respect to the base element. Suitable bearing devices of this kind are for example ball bearings or plain bearings, but in particular bearing devices which are suitable and intended for absorbing large vertical compressive forces. In this case, it is possible for the supporting element to be arranged interchangeably on the base carrier or the shaft. In this way, replacement in the event of damage to the supporting element is possible.

In a further advantageous embodiment, the underside of the supporting element, or a contact surface with the floor surface, could be formed with a material that has a low friction coefficient (for example PTFE). The supporting element could likewise have a roller element as "sliding shoe", such that, upon moving for instance over a threshold, the roller is raised slightly and can thus travel or roll better over the obstacle.

As mentioned above, the first position is advantageously a desired position in which the carrying arrangement stands in an upright manner on the floor surface and/or the second position is a tilted position in which the carrying arrangement is tilted with respect to the desired position.

In a further advantageous embodiment, the axis of rotation of at least one roller element is offset with respect to the pivot axis in a direction perpendicular to the pivot axis. In geometrical terms, these two axes are thus skewed with respect to one another, or do not intersect one another. In this way, if the carrying arrangement is shifted or rolled, the roller elements can be oriented or pivoted (by this movement) into a desired position or pivoted position with respect to the base carrier. In a further advantageous embodiment, the supporting element, too, is pivotable about the pivot axis and in particular pivotable in a circumferential direction extending around the pivot axis. In this case, it is in particular conceivable for the supporting element to be pivotable about the pivot axis together with the roller element to which it is assigned. In a further advantageous embodiment, each roller element is assigned such a supporting element.

In general, the mass of the carrying arrangement, which is preferably embodied as a stand, can turn out to be much less on account of the tipping prevention means, since it is possible for an additional mass not to be required in order to keep the center of gravity low. In addition, it is also possible to keep the footprint smaller than without a tipping prevention means.

As a result of the likewise pivotable arrangement of the supporting element, the action of the tipping prevention means can also be improved. The roller element(s) preferably always orient themselves automatically such that the tipping prevention means, for example, the supporting element, acts in the pushing or pulling direction, that is, the direction of the applied torque.

Preferably, at least one roller element and preferably each roller element is also assigned a supporting element. As a result of the deliberate choosing of the wheel assignment to the integrated tipping prevention means or to the respective supporting element, in particular also with respect to the predetermined transporting direction, ideal tipping prevention can always be achieved. This advantage is maintained even when the rollers are fixed in the transporting direction.

In addition, it is also possible to easily compensate for asymmetries of the structures and the associated preferred tipping direction by way of a corresponding assignment of the roller with tipping prevention means. As a result, the action of the tipping prevention means is always the best possible. There is no worst case to be taken into consideration.

In a further preferred embodiment, only one supporting element per roller element is provided. The automatic orientation requires only one tipping prevention means or one supporting element per roller, in contrast to supporting elements fastened to the housing. In the case of a tipping prevention means arranged on the housing, a separate tipping prevention means is necessary for each possible tipping direction.

In addition, a tipping prevention means arranged on the appliance also increases the maximum dimensions of the base. In this case, the width of the base can exceed the width of a door. This can result in the base (with the appliance arranged thereon) no longer being able to be pushed through a door. A tipping prevention means fixed to the roller does not have this drawback, since it is always oriented in an ideal manner.

Furthermore, there are also no interfering edges (or "trip hazards"), as occur upon mounting on the foot (housing).

The effective lever arm of the tipping prevention means in a lateral configuration according to the invention can in this case turn out to be greater than the width of a door, since the rollers are, of course, "retracted" on travelling through the door. The effective lever arm becomes greater than the lever arm determined by the fastening of the roller, not smaller as in all other rollers with a trailing side.

The tipping prevention means proposed does not disturb the user when pushing the appliance since it is, of course, oriented in the other (opposite) direction.

With regard to the fastening of the rollers, the roller elements are preferably arranged with a trailing side, such that they rotate counter to the direction of forward movement of the base when the base is moved. In this case, the tipping prevention means preferably acts in the opposite direction. If the direction of movement changes, the direction of the rollers with a trailing side changes and the tipping prevention means advantageously acts in the direction of the changed direction of movement.

As mentioned above, it would also be conceivable to attach the supporting element, or the tipping prevention means, to the base carrier, however. In this case, it would be possible for such tipping prevention to be achieved with two such supporting elements, which are each arranged here between two roller elements on each side of the foot that is at risk of tipping. In a further advantageous embodiment, a pivoting movement of a supporting element about the pivot axis is coupled with a pivoting movement of the roller element assigned to the supporting element. In this way, an optimum orientation of the supporting element, too, can always be achieved in dependence on a direction of movement of the carrying arrangement. Thus, it is in particular possible for the supporting element always to be oriented in dependence on the direction of movement such that it is located in front of the roller element in this direction of movement. This can be achieved for instance in that the supporting element is arranged together with the roller element on a pivotable carrier and thus the supporting element is pivoted equally when the roller element is pivoted.

In a further advantageous embodiment, at least one roller element is lockable. This means that the rotary movement of the roller element can be deliberately blocked. In this way, the carrying arrangement can be locked in a particular position with respect to the floor surface. It is also possible for the pivotability of the roller element with respect to the base carrier to be preventable or blockable.

In a further advantageous embodiment, the carrying arrangement and/or the supporting element and/or the roller element has/have a cable deflecting device. This prevents the roller element from travelling for example over cables, tubes and the like. Thus, for example, the roller element could be formed inside a cage which pushes away disruptive cables, such that cables and tubes do not come into contact with the roller element or wheel. In this case, it would also in particular be conceivable for the supporting element itself to be in the form of a cable deflector. Preferably, the cable deflecting device is arranged beneath the base carrier.

In the course of a conventional movement of the apparatus, the roller element will usually orient itself about the pivot axis such that the supporting element is in front of the roller element in the direction of movement. In this way, it is conceivable for the supporting element itself to be in the form of a cable deflector. Advantageously, each roller element is assigned (at most) one such supporting element. Therefore, such a cable deflecting device is preferably provided only in one direction of the supporting element. In this way, the abovementioned footprint can be kept small. Advantageously, each roller element is assigned a cable deflecting device.

Advantageously, in this case, at least one of these supporting elements is simultaneously also in the form of a cable deflecting device. In this case, at least one supporting device can preferably have an inclined surface which pushes cables, tubes and the like upwards on contact therewith.

Therefore, at least one supporting element is preferably configured such that, when the carrying arrangement is moved with respect to the floor surface, it orients itself such that it is arranged in front of the roller element in the direction of movement.

In a further advantageous embodiment, the roller element and the supporting element assigned to the roller element are arranged on a common carrier which is pivotable about the pivot axis. In this case, it can be for example a carrier plate, but it would also be conceivable for this carrier to be the abovementioned shaft, on which the roller element is arranged.

In a further advantageous embodiment, the supporting element has a contact surface for contacting the floor surface and the pivot axis extends between this contact surface and a roller contact surface by means of which the roller element contacts the floor surface. As a result of this geometric arrangement, when the appliance is tilted, the contact surface or the supporting element can come into contact with the floor. Therefore, the roller element and the supporting element are preferably arranged on opposite sides with respect to the pivot axis.

Advantageously, the supporting element and/or the contact surface of the supporting element is/are arranged outside the outer circumference of the roller element. Advantageously, the pivot axis always extends (for example, independently of a pivoted position of the roller element about the pivot axis) between the supporting element and the roller element.

In a further advantageous embodiment, the contact surface of the supporting element extends in an inclined manner with respect to the floor surface. It is also preferred, in an upright state of the apparatus, for a portion of the contact surface (of the supporting element) that is located closer to the axis of rotation of the roller element to be closer to the floor surface than a portion further away. In this way, in the event of tilting, it is possible for a relatively large area of contact with the floor surface to arise. In other words, in this configuration, the entire area of the contact surface touches the floor surface and in this way, compressive forces that arise can be absorbed very favourably. Preferably, the contact surface is formed in a substantially planar manner.

As mentioned above, the carrying arrangement preferably has a cable deflecting device for deflecting cable elements. This cable deflecting device can in this case preferably be formed on a supporting element. However, it would also be possible for the cable deflecting device to be arranged at a different position on the base carrier.

In a further advantageous embodiment, a contact surface of the supporting element contacts the floor surface when the carrying arrangement is inclined by at least 12°, preferably by at least 10°, preferably by at least 8°, particularly preferably by at least 7° with respect to a desired position (generally when the carrying arrangement has been inclined with respect to a desired position of the carrying arrangement to such an extent that the center of gravity of the carrying arrangement is located just not over the pivot point of tipping, for example, over the point at which the roller, about which tipping takes place, touches the floor).

Thus, as a result of the arrangement of the supporting element, it is possible to determine the tipping position from which the supporting element is intended to come into contact with the floor surface. In this case, this distance is preferably chosen such that the supporting element itself does not prevent the apparatus from moving on account of minor floor irregularities, but nevertheless effective tipping prevention is achieved.

In a further advantageous embodiment, the supporting element has a damping element, in particular a shock absorber element, which is suitable and intended for damping forces that act in the event of a collision with the associated roller element. Thus, it would be possible for the supporting element itself to be in the form of a damping element, for example in that the supporting element itself is a resilient body, or in that the damping element is arranged in a resilient manner on the base carrier.

In addition, however, it would also be conceivable for a further damping element, such as, in particular but not exclusively, a resilient element, to be arranged on the supporting element. Preferably, in this case, the damping element is arranged such that it is directed forwards when the carrying arrangement is moved in the direction of movement, in order to be able to come into effect in the event of collisions with other objects. Thus, a resilient body could be arranged on the supporting element. Therefore, the damping element is preferably a resilient element.

In a further advantageous embodiment, the supporting element is configured as a sliding shoe or has a sliding shoe or is provided with an additional roller element, such that steps or elevations and in particular steps up to a height of the front edge of the contact surface can be negotiated more easily. By way of this procedure, the roller elements can be protected even in the event of elevations or steps.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
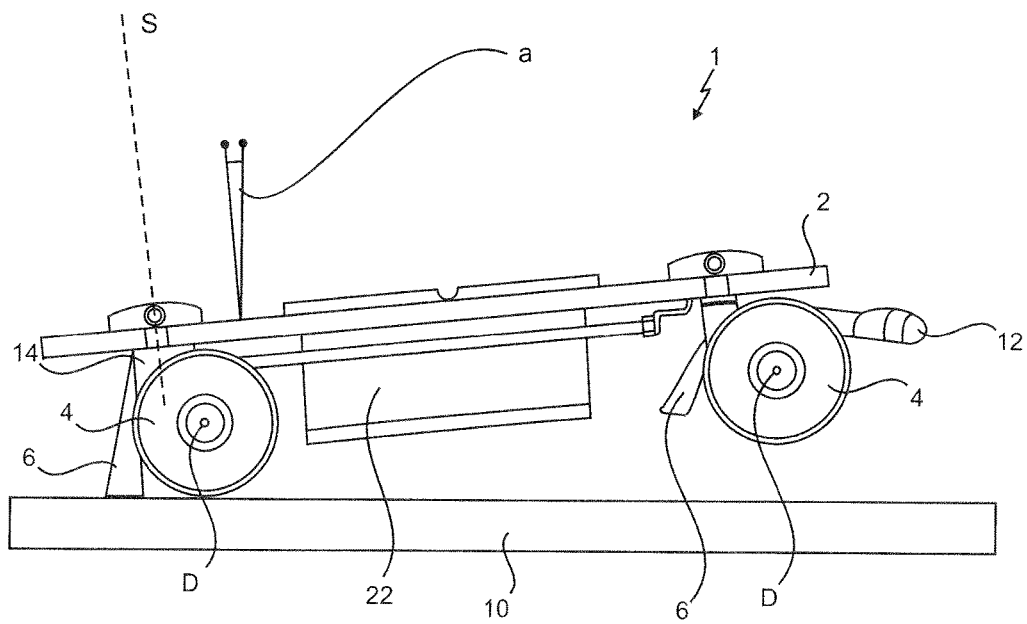
FIG. 1 shows an illustration of an apparatus according to the invention in a tipped state.
Figure 2:
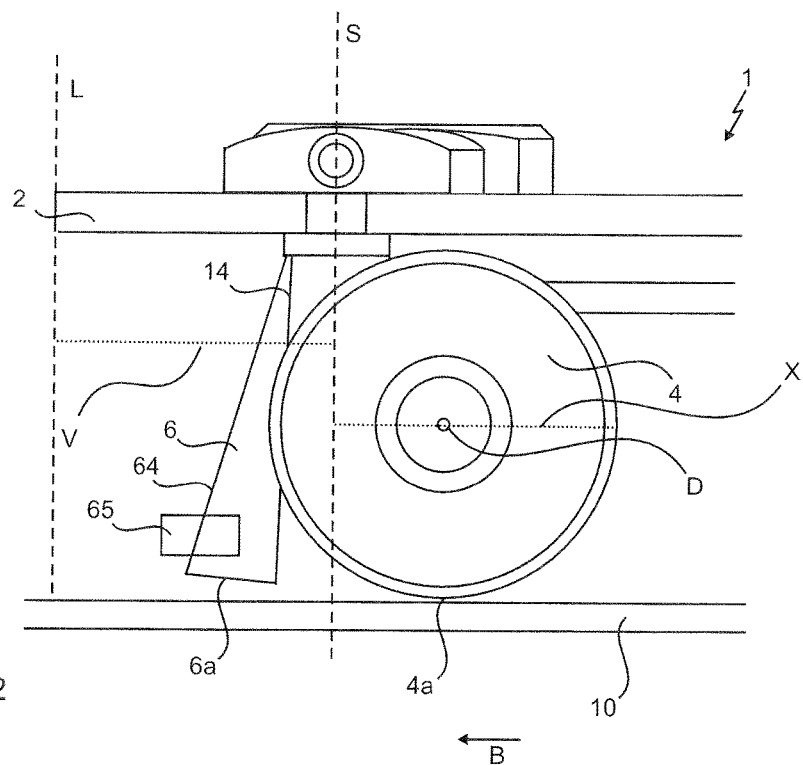
FIG. 2 shows a detailed illustration of the apparatus from FIG. 1 in a first, or non-tipped, position; and, FIG. 3 shows a detailed illustration of the apparatus according to the invention in the event of floor irregularities.

FIG. 1 shows an illustration of an apparatus 1 according to the invention in a tipped position, for example, the abovementioned first position. In this case, this apparatus 1 has four roller elements 4, of which only the two front roller elements are shown, however. These roller elements 4 are each rotatable about axes of rotation D. Furthermore, the roller elements are each pivotable about a pivot axis S, wherein these respective pivot axes S extend perpendicularly to the axes of rotation D. In a normal state, for example, an upright state, this pivot axis S extends vertically, as shown in FIG. 2.

The reference sign 12 indicates a lever-like locking element, by means of which the rotation of the roller can be locked. In this way, the apparatus 1 itself can also be locked. In this case, it is conceivable for all of the roller elements to be assigned such locking elements 12, but it would also be conceivable for only one or two roller elements to be able to be locked in this way.

The reference sign 2 identifies a base carrier, on which the individual roller elements are arranged. In this case, a rotatable shaft 14 can be arranged on this base carrier 2, which shaft 14, as shown in FIG. 1, is in turn pivotable about the pivot axis S. The reference sign 10 identifies the surface, or the floor, with respect to which the apparatus 1 is movable. The reference sign 6 identifies a supporting element. In the situation shown in FIG. 1, this supporting element 6 is contacting the floor and, in this way, further tipping of the apparatus 1 is prevented. To be more precise, a very much greater force is now necessary in order to tip the apparatus beyond the maximum tipping angle a.

Preferably arranged on the base carrier 2 is a frame (not shown) which serves to hold medical apparatuses. In this case, this frame can also be connected integrally to the base carrier. This frame preferably has holding spaces for holding medical apparatuses (not shown). In this case, it would be possible for these medical apparatuses to be connected firmly to the frame. The reference sign 22 identifies a mass element which is arranged on the base carrier 2 and beneath the base carrier. By way of this mass element 22, the center of gravity of the entire carrying arrangement 1 is shifted downwards.

FIG. 2 shows a detailed illustration of the apparatus from FIG. 1 in a non-tipped state, for example, in a desired position, or the abovementioned first position of the carrying arrangement. Here too, the supporting element 6, which is arranged on the shaft 14, can be seen again. The reference sign 6a indicates a contact surface by means of which the supporting element 6 contacts the floor surface 10 in a tipped state (shown in FIG. 1). The reference sign 4a indicates a contact surface by means of which the roller element 4 contacts the floor surface 10. It can be seen that the pivot axis S extends between the contact surface 6a of the supporting element 6 and the contact surface 4a of the roller element 4 (as seen in the horizontal direction). In this way, reliable supporting of the apparatus 1 can be achieved. The reference sign 64 indicates an outer surface of the supporting element, the surface simultaneously also serving as a cable deflecting device. This outer surface 64 in this case extends in an inclined manner such that cables or tubes (not shown) can be pushed upwards by this outer surface.

The reference sign B indicates the direction of movement of the apparatus. When the apparatus 1 moves in the direction of movement B, the roller element 4 will be in the orientation shown in FIG. 2. In a corresponding manner, in this situation, the contact surface 6a is arranged in front of the roller element 4 and also in front of the pivot axis S (with respect to the direction of movement B). As a result of the configuration of the contact surface 6a it is also possible for example, for the adjusting angle to be set, contact between the contact surface 6a and the floor surface 10 being intended to occur from the tipping angle. It is also possible to see that the contact surface 6a is inclined with respect to the floor surface 10 here. In this case, an inclination angle of this contact surface with respect to the (horizontal) floor preferably also corresponds to the angle a shown in FIG. 1.

The reference sign X indicates the maximum horizontal distance between the pivot axis S and an outer circumference of the roller element. Preferably, this maximum horizontal distance X is less than a (horizontal) distance V between the pivot axis S and the (lateral) boundary of the base carrier 2 (indicated by the vertical line L). In this way, the roller element 4 does not project beyond the base carrier, regardless of its pivoted position about the pivot axis S. In this way, the footprint of the carrying arrangement 1 also remains the same, regardless of the pivoted positions of the individual roller elements 4.

The reference sign 65 schematically shows a damping element which is arranged in this case on the supporting element. In this case, this damping element can be for instance adhesively bonded or screwed to the supporting element. Preferably, it is a resilient damping element. Preferably, this damping element is arranged on the lower half of the supporting element. In the direction of movement shown in FIG. 2, the damping element will orient itself forwards in this direction of movement and therefore, in the event of collisions with other objects, will touch the latter first. It would also be possible, in contrast to the embodiment shown, for the damping element 65 to be integrated into the supporting element such that a portion of the supporting element can pivot slightly with respect to a further portion of the supporting element and thus impacts can be damped.

Figure 3:
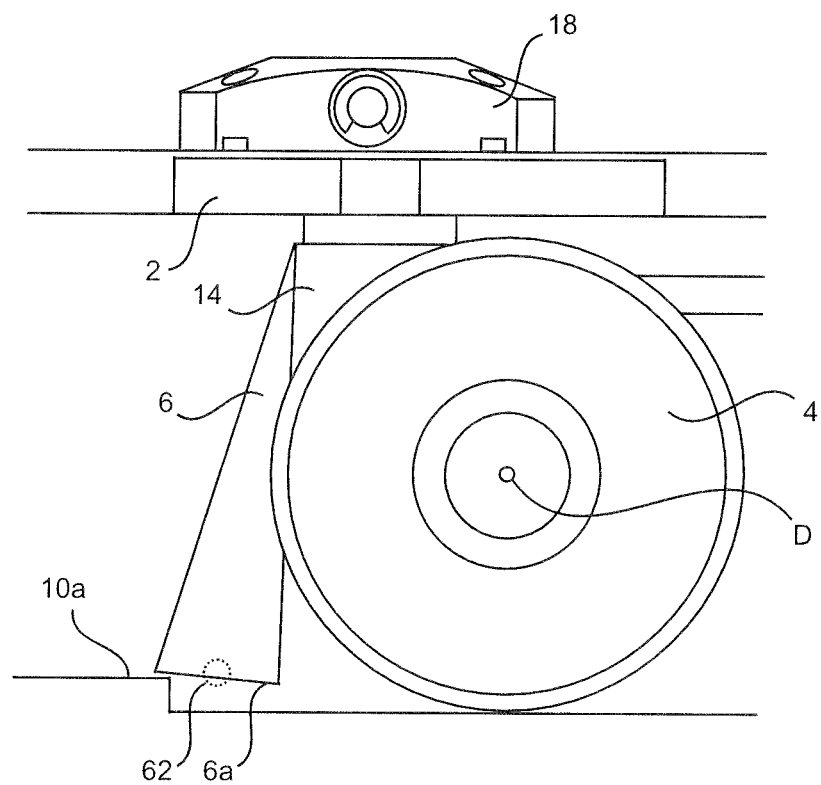

FIG. 3 shows a further configuration of the apparatus shown in FIG. 2. A floor irregularity 10a, for example a threshold, can be seen here. As a result of the configuration of the supporting element 6 and in particular of the contact surface 6a, it is more easily possible for the roller element 4 to cross the floor threshold 10a. In this way, the supporting element 6 can also be used to compensate for floor irregularities and for instance also thresholds. As mentioned above, the contact surface 6a is preferably embodied in a low-friction manner and can also have roller elements 62 (illustrated by a dotted line). The reference sign 18 indicates a fastening device by means of which the roller element 4 is arranged on the carrier 2 in particular so as to be pivotable about the pivot axis shown in FIG. 2.

It is understood that the foregoing description is that of the preferred embodiments of the invention and that various changes and modifications may be made thereto without departing from the spirit and scope of the invention as defined in the appended claims.

LIST OF REFERENCE SIGNS

1 Apparatus
2 Base carrier
4 Roller elements
4a Contact surface
6 Supporting element
6a Contact surface
10 Surface/floor
10a Floor irregularity/threshold
12 Locking element
14 Rotatable shaft
18 Fastening device
22 Mass element
62 Roller element in supporting element
64 Cable deflecting device, inclined surface of the supporting element
65 Damping element
S Pivot axis
D Axis of rotation
a Tipping angle
B Direction of movement
X Horizontal distance between pivot axis and outer circumference
Horizontal distance between pivot axis and base carrier
L Lateral boundary of the base carrier

What is claimed is:

1. A carrying arrangement for carrying an apparatus, the carrying arrangement comprising:
a base carrier;
at least three roller elements arranged on said base carrier so as to enable the carrying arrangement to move with respect to a floor surface;
said at least three roller elements each being configured to be rotatable about respective axes of rotation (D);
at least one of said at least three roller elements being configured to be pivotable about a pivot axis (S) with respect to said base carrier;
said axes of rotation (D) and said pivot axis (S) extending in different directions;
at least one supporting element arranged at least indirectly on said base carrier;
the carrying arrangement defining a first position and a second position with respect to the floor surface;
said supporting element being configured to not contact the floor surface in said first position of the carrying arrangement;
said supporting element being configured to contact the floor surface in said second position of the carrying arrangement;
said second position being pivoted with respect to said first position;
the carrying arrangement being configured to have medical apparatuses fixed in position thereto;
said supporting element having an outer surface; and,
said outer surface extending in an inclined manner so as to enable at least one of a cable and a tube to be pushed upwards by said outer surface.

2. The carrying arrangement of claim 1, wherein:
said first position is a desired position in which the carrying arrangement stands in an upright manner on the floor surface; and,
said second position is a tilted position in which the carrying arrangement is tilted with respect to said desired position.

3. The carrying arrangement of claim 1, wherein said first position is a desired position in which the carrying arrangement stands in an upright manner on the floor surface.

4. The carrying arrangement of claim 1, wherein the carrying arrangement is configured to carry a medical apparatus.

5. The carrying arrangement of claim 1, wherein said axis of rotation (D) of at least one of said at least three roller elements is offset with respect to said pivot axis (S) in a direction perpendicular to said pivot axis (S).

6. The carrying arrangement of claim 1, wherein said supporting element is pivotable about said pivot axis (S).

7. The carrying arrangement of claim 1, wherein each of said at least three roller elements has a respective supporting element associated therewith.

8. The carrying arrangement of claim 6, wherein said supporting element is configured such that a pivoting movement of said supporting element with respect to said pivot axis (S) is coupled with a pivoting movement of said pivotable roller element.

9. The carrying arrangement of claim 1, wherein said pivotable roller element is configured to not, regardless of a pivoted position of said pivotable roller element about its pivot axis (S), project or project only slightly beyond said base carrier in a horizontal direction.

10. The carrying arrangement of claim 1, wherein:
said pivotable roller element defines a roller contact surface via which said pivotable roller element contacts the floor surface;
said supporting element has a contact surface for contacting the floor surface; and,
said pivot axis (S) extends between said contact surface and said roller contact surface.

11. The carrying arrangement of claim 1 further comprising a cable deflecting device configured to deflect cable elements.

12. The carrying arrangement of claim 1, wherein at least one of said supporting element and said at least three roller elements has a cable deflecting device configured to deflect cable elements.

13. The carrying arrangement of claim 1, wherein said supporting element has a contact surface configured to contact the floor surface when the carrying arrangement has been inclined with respect to a desired position of the carrying arrangement to such an extent that the center of gravity of the carrying arrangement is located just short of the pivot point of tipping.

14. The carrying arrangement of claim 1, wherein said supporting element has a contact surface configured to contact the floor surface when the carrying arrangement has been inclined with respect to a desired position of the carrying arrangement to such an extent that the center of gravity of the carrying arrangement is located just short of a point at which the roller, about which tipping takes place, touches the floor.

15. The carrying arrangement of claim 1, wherein said supporting element has a damping element configured to damp forces that act in the event of a collision with said pivotable roller element.

16. The carrying arrangement of claim 1, wherein said supporting element is configured as a sliding shoe.

17. The carrying arrangement of claim 1, wherein said supporting element has a sliding shoe.

18. The carrying arrangement of claim 1 further comprising an additional roller element configured such that steps up to a height of the front edge of the contact surface can be negotiated more easily.

19. The carrying arrangement of claim 1, wherein:
said supporting element has a contact surface formed in a substantially planar manner; and,
said supporting element is configured to contact the floor surface with said contact surface.

20. The carrying arrangement of claim 1, wherein:
said supporting element has a contact surface;
said supporting element is configured to contact the floor surface with said contact surface;
said contact surface extends in an inclined manner with respect to the floor surface;
said contact surface includes a first portion and a second portion;
said first portion of said contact surface, in an upright state of the carrying arrangement, is located closer to the axis of rotation of said roller element and is closer to the floor surface than said second portion.

21. The carrying arrangement of claim 15, wherein said damping element is resilient.

22. A carrying arrangement for carrying a medical apparatus, the carrying arrangement comprising:
a base carrier;
at least three roller elements arranged on said base carrier so as to enable the carrying arrangement to move with respect to a floor surface;

said at least three roller elements each being configured to be rotatable about respective axes of rotation (D);

at least one of said at least three roller elements being configured to be pivotable about a pivot axis (S) with respect to said base carrier;

said axes of rotation (D) and said pivot axis (S) extending in different directions;

at least one supporting element arranged at least indirectly on said base carrier;

the carrying arrangement defining a first position and a second position with respect to the floor surface;

said at least one supporting element being configured to not contact the floor surface in said first position of the carrying arrangement;

said at least one supporting element having a linear contact surface configured to be in linear contact engagement with the floor surface in said second position of the carrying arrangement;

said second position being pivoted with respect to said first position;

said pivot axis (S) and an imaginary line perpendicular to the floor surface conjointly defining a tipping angle a in said second position of the carrying arrangement;

said linear contact surface defining an inclination angle with respect to the floor surface in said first position; and, said inclination angle corresponding with said tipping angle a.

23. A carrying arrangement for carrying a medical apparatus, the carrying arrangement comprising:

a base carrier;

at least three roller elements connected to said base carrier so as to enable the carrying arrangement to move with respect to a floor surface;

said at least three roller elements each being configured to be rotatable about respective axes of rotation (D);

at least one of said at least three roller elements being configured to be pivotable about a pivot axis (S) with respect to said base carrier;

said axes of rotation (D) and said pivot axis (S) extending in different directions;

at least one supporting element arranged at least indirectly on said base carrier;

the carrying arrangement defining a first position and a second position with respect to the floor surface;

said supporting element being configured to not contact the floor surface in said first position of the carrying arrangement;

said supporting element being configured to contact the floor surface in said second position of the carrying arrangement;

said second position being pivoted with respect to said first position; and, a mass element arranged on said base carrier by way of which a center of gravity of said carrying arrangement with the medical device attached thereto is shifted downwards the center of gravity of said mass element being lower than the connection of said at least three roller elements to said base carrier.

24. The carrying arrangement of claim 23, wherein:

at least four roller elements are arranged on said base carrier so as to enable the carrying arrangement to move with respect to a floor surface;

said at least four roller elements are each configured to be rotatable about respective axes of rotation (D); and, at least one of said at least four roller elements is configured to be pivotable about a pivot axis (S) with respect to said base carrier.

* * * * *

UNITED STATES PATENT AND TRADEMARK OFFICE
CERTIFICATE OF CORRECTION

PATENT NO. : 10,189,493 B2
APPLICATION NO. : 15/441076
DATED : January 29, 2019
INVENTOR(S) : G. Grubauer et al.

Page 1 of 1

It is certified that error appears in the above-identified patent and that said Letters Patent is hereby corrected as shown below:

In the Specification

In Column 3:
Line 59: delete "where specified also) 10°." and substitute -- where specified also 10°). -- therefor.

In Column 10:
Line 66: insert -- V -- before -- Horizontal distance between pivot axis and base carrier --.

Signed and Sealed this
Twenty-fifth Day of June, 2019

Andrei Iancu
*Director of the United States Patent and Trademark Office*